UNITED STATES PATENT OFFICE.

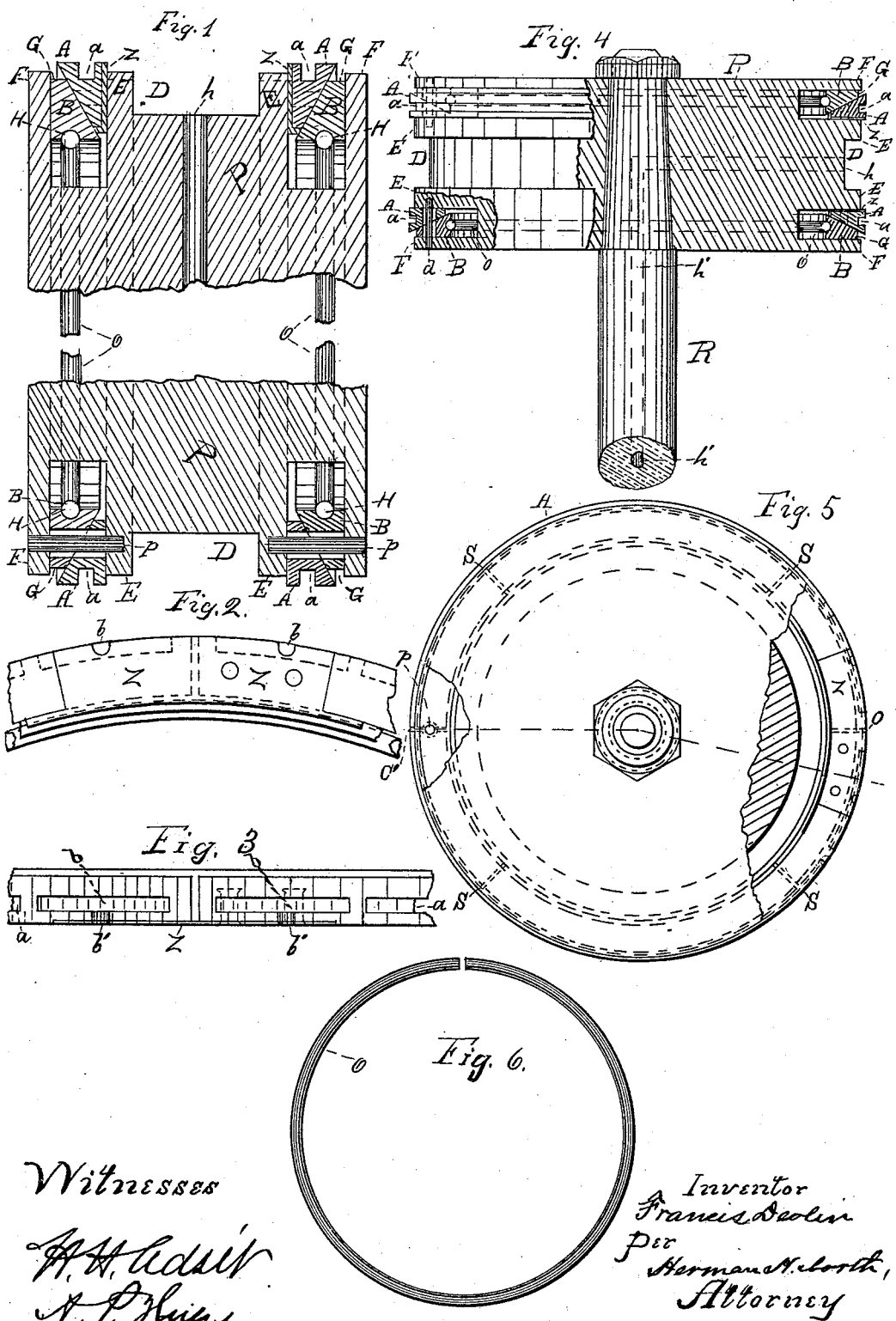

FRANCIS DEVLIN, OF BRADFORD, PENNSYLVANIA.

PISTON-PACKING.

SPECIFICATION forming part of Letters Patent No. 415,097, dated November 12, 1889.

Application filed December 2, 1886. Renewed May 3, 1889. Serial No. 309,498. (No model.)

*To all whom it may concern:*

Be it known that I, FRANCIS DEVLIN, a subject of the Queen of Great Britain, residing at Bradford, in the county of McKean and State of Pennsylvania, have invented certain new and useful Improvements in Piston-Packing; and I do hereby declare the following to be a full, clear, and explicit description of the invention, such as will enable others skilled in the art to which it appertains to make and use the same.

The object of my invention is to make a metallic steam-packing for horizontal and incline cylinders, first, that will tend to lie against the surface of the cylinder by its own weight; second, that will hold firmly against the flange of the piston to prevent the escape of steam between the packing-ring and the flange of the piston; third, that is self-compensating between the flanges of the piston and also self-compensating to the diameter of its cylinder; fourth, that will pack with the least possible friction against the surface of the cylinder and that will run noiseless; fifth, that will obviate the tendency of the piston to wear the cylinder oval; sixth, that will not wear the cylinder largest where the pressure is greatest when the engine works expansively; seventh, in which the wear of the face of the rings and the flanges of the piston from lateral motion is obviated; eighth, so arranged as to carry water or other lubricant between two sets of rings; ninth, that conducts its leakage to the condenser or atmosphere.

In the accompanying drawings, Figure 1 is a broken section through center of piston. Fig. 2 is a partial side view of rings and spring, showing manner of forming joint, also showing equalizing-chamber and outlet connecting with and leading to recess in middle of piston. Fig. 3 is a side view of Fig. 2. Fig. 4 is a section and elevation of piston and part of piston-rod, showing parts already described and showing connection of equalizing-chamber with atmosphere or condenser through hole in the piston or tube and piston-rod. Fig. 5 is a plan view of Fig. 4, and shows the divisions of adjusting and packing rings and the position in which the packing-rings are held. Fig. 6 shows a side view of adjusting-spring.

My positive metallic packing-rings for horizontal and incline cylinders consist of rings A A and B B. The rings A A are turned to the size of the cylinder, (see Figs. 1 and, 4) and are cut in halves each, and an L-joint $z$ is riveted to one end of a section of each of the packing-rings A A, Figs. 2 and 3. These riveted joints are kept at the top of the piston P, and dowel-pins $p$ $p$ are inserted in the piston-head P, and passing through the rings A A and B B prevent them from turning, Fig. 1; hence the cuts C C', Fig. 5, in the packing-rings A A stand vertical in the cylinders, so that each half or section of the packing-rings A A tends to lie against the surface of the cylinder by its own weight. This vertical position of the sections prevents any leak of steam or fluid through the cut or clip C, Fig. 5, at the bottom. The sagging away of the piston-head P, Fig. 4, at the top shows why the lap or joint must be kept at the top; otherwise it would soon leave the cut or clip C, Fig. 5, in rings A A at top exposed and steam would blow through.

Each of the packing-rings A A has an annular groove or recess $a$ on its periphery. The groove $a$, Fig. 1, is partitioned off at or near the top of each section of the rings A A, thus forming separate chambers $b$, Figs. 2 and 3, and has an opening or outlet $b'$, connecting each of these four chambers with the recess D between the rings A A, Fig. 1. The annular grooves $a$ receive steam at the botton of the piston-head at the cut C, Fig. 5, of the rings A A; but no steam is allowed to enter the equalizing-chambers $b$, Figs. 2 and 3, at or near the top of the rings A A, and any steam that would accumulate in the equalizing-chamber would be leeched away through the holes $b$ $b'$ to and through the holes $h$ $h'$ to the atmosphere or condenser, Fig. 4, or connected through a tube with the condenser.

The ring A is faced square at one side and beveled at the opposite side to receive the adjusting-ring B. It may be seen that the constructing of the rings A and B is such as to insure a perfect joint between the flange E and the face of the ring A. In other words, they are self-compensating between the flanges E and F. (See Figs. 1 and 4.)

The rings A and B are so fitted between the flanges E and F as to leave or form an annular recess G, Figs. 1 and 4, which allows adjustment of ring B and admission of steam between divisions S S S S, Fig. 5, of adjusting-rings B B. This is for the purpose of holding the packing-rings A A against the cylinder and the flanges E E.

The adjusting-rings B B have annular grooves or recesses on their inner diameters to receive a wire or other suitable spring O, (see Fig. 6,) for the purpose of holding the rings A A and B B in their proper position.

The steam acts alternately on each pair of the rings A and B.

In condensing-engines a tube may be used instead of the hole in the piston-rod, and thus connect the space between the rings A A with the condenser or air-pump. In this case a one-piece piston is shown, but may be made in several of the well-known ways.

What I claim as new and as my invention is—

1. The combination, with the piston-head provided with annular recesses, of the adjusting-rings placed in the recesses, the beveled rings A, and the springs O, placed in the recesses in the piston-head and made to bear against the inner edges of the adjusting-rings, substantially as shown.

2. The combination of the piston-head provided with the flanges E F and the annular recesses G in the flanges, the adjusting-rings B, placed in the recesses, the springs for forcing the rings outward, and the beveled rings A, also placed in the recesses and made to bear against the beveled sides of the adjusting-rings, substantially as described.

3. The combination, with a piston-head having annular grooves, of the beveled adjusting-rings, the beveled packing-rings, and pins which are passed into the head and through openings in the rings, substantially as described.

4. The combination, with the piston-head provided with flanges E F and the annular recess in between the flanges and having equalizing-chambers $b$, of the hole $h$ and the piston-rod R, having an opening through it and communicating with the hole $h$, substantially as specified.

In testimony whereof I affix my signature in presence of two witnesses.

FRANCIS DEVLIN.

Witnesses:
H. H. ADSIT,
A. P. HUEY.